(12) United States Patent
Chew et al.

(10) Patent No.: US 7,743,181 B2
(45) Date of Patent: Jun. 22, 2010

(54) QUALITY OF SERVICE (QOS) PROCESSING OF DATA PACKETS

(75) Inventors: Yen Hsiang Chew, Penang (MY); Shanggar Periaman, Penang (MY); Kooi Chi Ooi, Penang (MY); Bok Eng Cheah, Penang (MY)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 11/774,848

(22) Filed: Jul. 9, 2007

(65) Prior Publication Data

US 2009/0019196 A1    Jan. 15, 2009

(51) Int. Cl.
*G06F 5/00*    (2006.01)

(52) U.S. Cl. ........................................ 710/48

(58) Field of Classification Search ........................ None
See application file for complete search history.

(56) References Cited

U.S. PATENT DOCUMENTS

| | | | | |
|---|---|---|---|---|
| 6,023,740 | A * | 2/2000 | Korhonen et al. | 710/45 |
| 6,944,739 | B2 * | 9/2005 | Bartling et al. | 711/168 |
| 7,421,521 | B2 * | 9/2008 | Trainin | 710/45 |
| 7,533,201 | B2 * | 5/2009 | Chew | 710/56 |
| 2005/0249228 | A1 * | 11/2005 | Cornett | 370/413 |
| 2006/0067346 | A1 * | 3/2006 | Tucker et al. | 370/412 |
| 2007/0138299 | A1 * | 6/2007 | Mitra | 235/492 |
| 2008/0155139 | A1 | 6/2008 | Chew | |
| 2008/0219279 | A1 | 9/2008 | Chew | |
| 2009/0122712 | A1 * | 5/2009 | Sharif-Ahmadi et al. | 370/252 |
| 2009/0138574 | A1 * | 5/2009 | Hui et al. | 709/219 |

OTHER PUBLICATIONS

Intel,8259A Programmable Interrupt Controller (8259A/8259A-2), Dec. 1988, Intel,Order No. 231468-003.*

\* cited by examiner

*Primary Examiner*—Henry W. H. Tsai
*Assistant Examiner*—Juanito C Borromeo
(74) *Attorney, Agent, or Firm*—Grossman, Tucker, Perreault & Pfleger, PLLC

(57) ABSTRACT

The present disclosure provides a method for providing Quality of Service (QoS) processing of a plurality of data packets stored in a first memory. The method may include determining a queue of a plurality of queues causing an interrupt using contents of an interrupt status register, the queue comprising address of at least one data packet of the plurality of data packets. The method may further include performing a logical operation between the contents of the interrupt status register and an interrupt mask of a plurality of interrupt masks, the plurality of interrupt masks stored in a second memory. The method may also include processing the plurality of data packets based on the logical operation and incrementing an interrupt mask address pointer stored in a third memory, thereby pointing to another interrupt mask of the plurality of interrupt masks. Of course, many alternatives, variations and modifications are possible without departing from this embodiment.

20 Claims, 7 Drawing Sheets

QUALITY OF SERVICE (QOS) PROCESSING OF DATA PACKETS

FIELD

The present disclosure relates to processing of data packets, and, more particularly, to Quality of Service (QoS) processing of data packets.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but are also intended to cover the application or implementation without departing from the spirit or scope of the claims of the present disclosure. Also, it should be understood that the phraseology and terminology used herein is for the purpose of description and should not be regarded as limiting.

The terms "first," "second," and the like herein do not denote any order, quantity, or importance, but rather are used to distinguish one element from another, and the terms "a" and "an" herein do not denote a limitation of quantity, but rather denote the presence of at least one of the referenced item.

Figure 1:
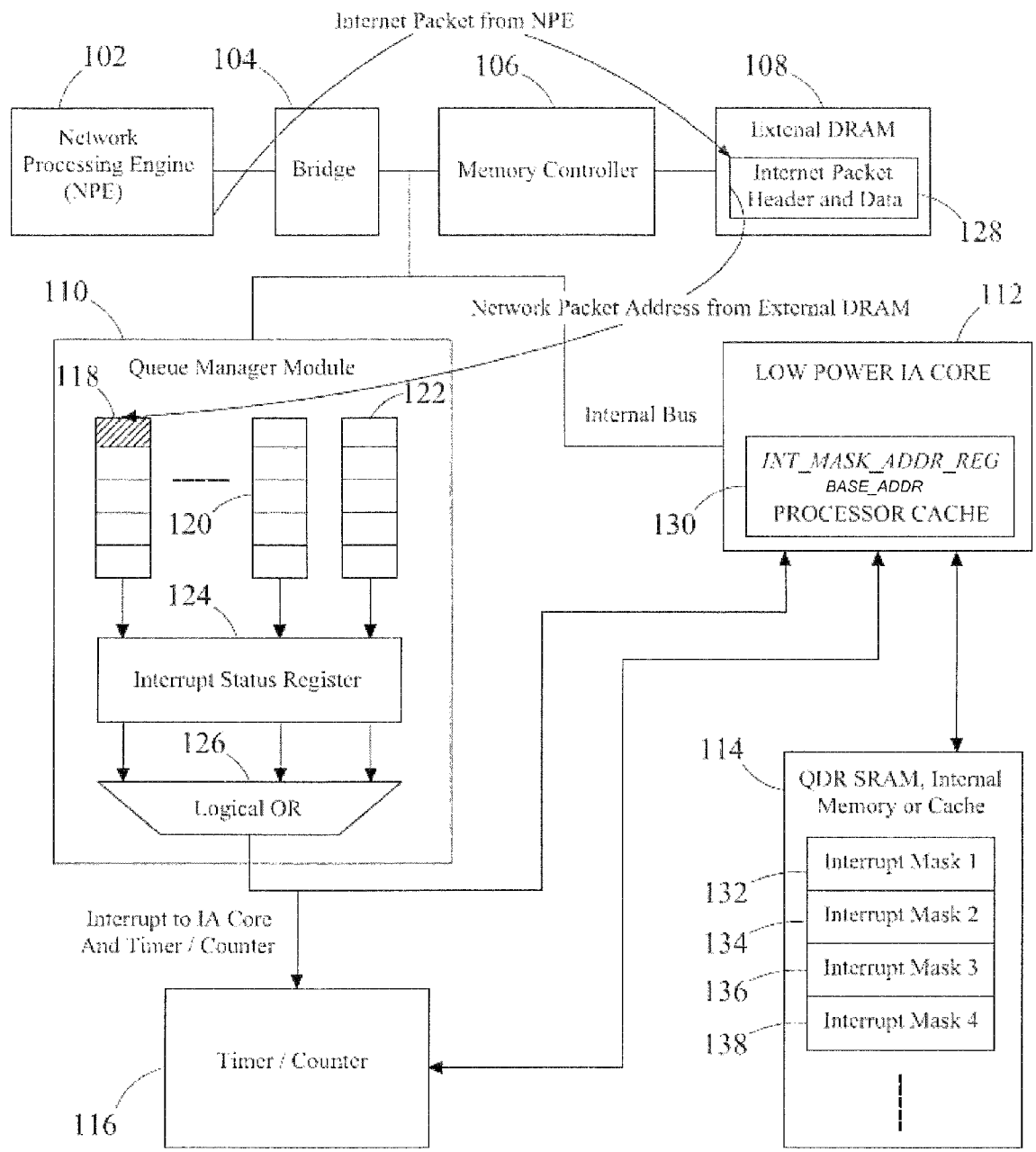
FIG. 1 illustrates a system for providing Quality of Service (QoS) processing of a plurality of data packets, according to an exemplary embodiment of the present disclosure.

FIG. 1 illustrates a system for providing Quality of Service (QoS) processing for a plurality of data packets 128. As used herein, QoS refers to a control mechanism for providing different priorities to data packets and a mechanism for ensuring a certain level of performance, while processing of data packets. The system comprises a Network Processing Engine (NPE) 102, a bridge 104, a Memory controller 106, an external Dynamic Random Access Memory (DRAM) 108, a queue manager module 110, a processor/low power IA core 112, a Static Random Access Memory (SRAM) 114, a counter 116.

The NPE 102 receives the plurality of data packets 128 for processing. The NPE 102 is a routing engine for providing modular and evolutionary performance scaling capabilities. The plurality of data packets received at the NPE 102 is stored in the external DRAM 108. However, the data packets may also be stored in a cache memory, SRAM or any other memory. The plurality of data packets 128 may be stored along with their header information in the external DRAM 108. An address of each data packet of the plurality of data packets 128 is stored in a plurality of queues in a queue manager module 110.

Each queue of the plurality of queues corresponds to a particular priority. For example, a queue 118 includes addresses of at least one data packet having the highest priority, a queue 122 includes addresses of at least one data packet having the least priority, and a queue 120 includes address of at least one data packet having an intermediate priority. Further, the number of queues maintained in the queue manager module 110 is scalable. The queue manager module 110 further comprises an interrupt status register 124 and a logical OR circuitry 126. The interrupt status register 124 is connected to the queues and each bit of the interrupt status register 124 specifies a queue of the plurality of queues causing an interrupt.

A queue causing an interrupt asserts the willingness for processing of the at least one data packet whose address are stored in the queue. For example, if the queue 118 causes an interrupt, then contents of the interrupt status register 124 will indicate that the queue 118 is requesting for process of the at least one data packet whose address are stored in the queue 118. The number of address of data packets that can be stored in the queue is a predefined value. The predefined value may be inputted by a user or specified by the system administrator. The logical OR circuitry 126 may perform a bit wise logical OR operation with the contents of the interrupt status register 124 and sends the interrupt to the processor 112 and the counter 116. The processor 112 may include a register/cache memory 130. The cache memory 130 stores a base address of a plurality of interrupt masks 132, 134, 136 and 138 stored in the SRAM 114. The plurality of interrupt masks 132, 134, 136, 138 are stored in consecutive memory locations starting from the base address. An interrupt mask is used for suppressing a certain interrupt and allowing the processor 112 to handle these interrupts later. The interrupt mask specifies whether the interrupt can be processed or not after an interrupt has occurred. Each interrupt of the plurality of interrupts corresponds to a queue of the plurality of queues. Accordingly, the length of interrupt masks stored in the SRAM 114 may equal the number of queues in the queue manager module 110.

The processor 112 may periodically perform a logical operation between the plurality of interrupt masks 132, 134, 136 and 138 stored in the SRAM 114 and the contents of the interrupt status register 124 sent to the processor 112 after processor 112 receives an interrupt from the Logical OR circuitry 126. The Logical OR circuitry 126 combines all interrupts from queues into one interrupt and sends the interrupt to processor 112 and counter 116 when any one or more queues request for service. Since queues assert their interrupt by updating their respective status bits in the interrupt status register, performing a bit wise Logical OR on the contents of the interrupt status register will generate a combine interrupt to processor and counter. After processor receives the combined interrupt, it knows that at least one queue is requesting for service. To determine which queues are requesting for service, processor reads the interrupt status register which contains the status of interrupt from ALL queues. For QoS purposes, processor reads an interrupt mask from the plurality of interrupt masks using the address pointed to by an interrupt mask address pointer stored in INT_MASK_ADDR_REG (counter 116 automatically advances this address pointer). Based on the logical operation (AND/OR) performed by processor between the interrupt status register and the interrupt mask, services will only be provided for queues whose interrupt has not been masked off by this logical operation. The logical operation can be at least one of an AND operation, an OR operation and any other logical operation. The plurality of interrupt masks 132, 134, 136 and 138 comprises a set of bit patterns pre programmed by the user. For example, a bit pattern of 0 corresponds to an interrupt mask indicating that the interrupt should not be processed, and a bit pattern 1 indicating that interrupt should be processed.

The plurality of interrupt masks 132, 134, 136 and 138 may be stored in an internal memory or in an external memory. The internal memory and the external memory may be a SRAM, DRAM, processor cache, and any other memory. The logical operation performed between the plurality of interrupt masks 132, 134, 136 and 138 stored in the SRAM 114 and the contents of the interrupt status register sent to the processor generates a result of the logical operation. For example, if in interrupt mask 1, 132 the corresponding interrupt enable bit for queue 1 is set to a bit pattern of 1 and the interrupt status bit of queue 1 read from interrupt status register 124 is 1; then if the processor 112 performs a logical AND operation, the result of logical operation will be 1. The processor may check the result of the logical operation and then perform the processing of the plurality of data packets based on the result of logical operation. Further, the length of interrupt masks corresponds to the number of queues and since the interrupt masks can be pre programmed therefore, the length of interrupt masks are configurable for scaling to more or less number of queues.

Figure 2:
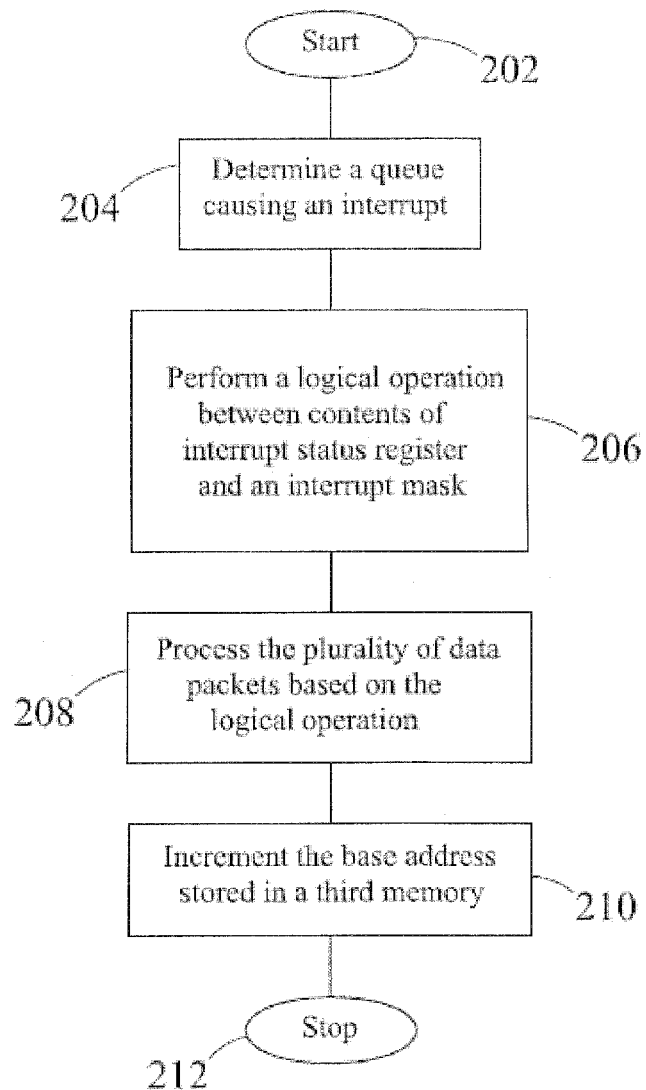
FIG. 2 is a flowchart illustrating a method for providing QoS processing of the plurality of data packets, according to an exemplary embodiment of the present disclosure.

FIG. 2 is a flowchart illustrating a method for providing QoS processing of a plurality of data packets. The method is initiated at operation 202, once a plurality of data packets is received at the NPE 102. The plurality of data packets is stored in a first memory, for example, the external DRAM 108. Addresses of the plurality of data packets stored in the DRAM 108 are stored in a plurality of queues in the queue manager module 110, for example, queues 118, 120 and 122. A plurality of interrupt masks 132, 134, 136 and 138 is stored in consecutive location in a second memory, for example, SRAM 114 starting from the base address. At operation 204, the queue causing an interrupt is determined. The queue causing the interrupt is specified in the interrupt status register 124. The Logical OR circuitry 126 may perform the bitwise logical OR operation on the interrupt status register and sends an interrupt to the processor 112 when any one or more queues in the plurality of queues cause an interrupt by updating their respective interrupt status register bit. At operation 206, the processor performs the logical operation between an interrupt mask of the plurality of interrupt masks 132, 134, 136 and 138 stored in the SRAM 114 and the contents of the interrupt status register 124. The logical operation can be AND, OR, and any other operation. Based on the logical operation performed, a result of the logical operation is generated by performing a logical operation between an interrupt mask and the interrupt status register 124. At operation 208, the processor 112 processes the plurality of data packets of the queue causing the interrupt, for example, the queue 118 based on the result of logical operation. At operation 210, the processor increments the interrupt mask address pointer stored in the interrupt mask address pointer register INT_MASK_ADDR_REG, which may be a register/processor cache 130.

The base address (e.g., BASE_ADDR) may correspond to an address of the interrupt mask 1, 132. Incrementing the base address may cause the base address to point to another interrupt mask, for example, interrupt mask 2. The base address may be stored in INT_MASK_ADDR_REG (this register may be used to keep track of the interrupt mask address pointer that points to an interrupt mask within the plurality of interrupt masks in SRAM 114) when the system resets, and may be incremented using the counter 116. This may be accomplished by using the value of counter 116 as an offset, and adding that offset to the base address of interrupt mask 1, 132 to form an address of another interrupt mask in the plurality of interrupt masks. In some embodiments, this may also be accomplished by resetting a subset of bits in counter 116 to base address of interrupt mask 1, 132; this subset of bits may become an address pointer that automatically traverses through the plurality of interrupt masks stored in SRAM 114 as the counter 116 advances. Processor 112 may read this subset of bits in counter 116 to update the interrupt mask address pointer INT_MASK_ADDR_REG. The same subset of bits used as the address pointer in counter 116 may be periodically reset to the base address of interrupt mask 1, 132 when the addresses of all interrupt masks stored in SRAM 114 have been traversed by counter 116. This assumes that interrupt mask 1 is the first interrupt mask in the consecutive masks set stored in SRAM.

The counter 116 may be connected to the queue manager module 110 and the processor 112. Once, interrupts are received from any one or more queues in the plurality of queues, the interrupt status register 124 may combine the interrupt through the logical OR circuitry 126 to interrupt the processor 112 and counter 116. The counter 116 may stop and the processor may read the value of counter 116 and compute an address pointing to an interrupt mask corresponding to a queue that has interrupted the processor 112. Counter 116 may restart when interrupt from queue manager module 110 is de-asserted. Moreover, processor 112 may be configured to stop, restart or change the value of counter 116. Further, the counter 116 may be programmed to reset whenever a count value reaches the number of interrupt masks stored in the SRAM 114. A subset of bits from the counter 116 may be used as an offset. The subset of bits to be used depends on how fast the base address of the interrupt mask needs to be updated and also the number of interrupt masks to be used. The offset may be added to the base address of interrupt mask 1, 132 in the processor cache 130 (e.g., INT_MASK_ADDR_REG), which may be located inside processor cache 130 or a register) to form another address, thereby pointing to another interrupt mask. For examples if the base address has to be incremented very fasts then some lower bits of counter 116 may be used as the offset, for example bits 3 to 11.

Figure 3:
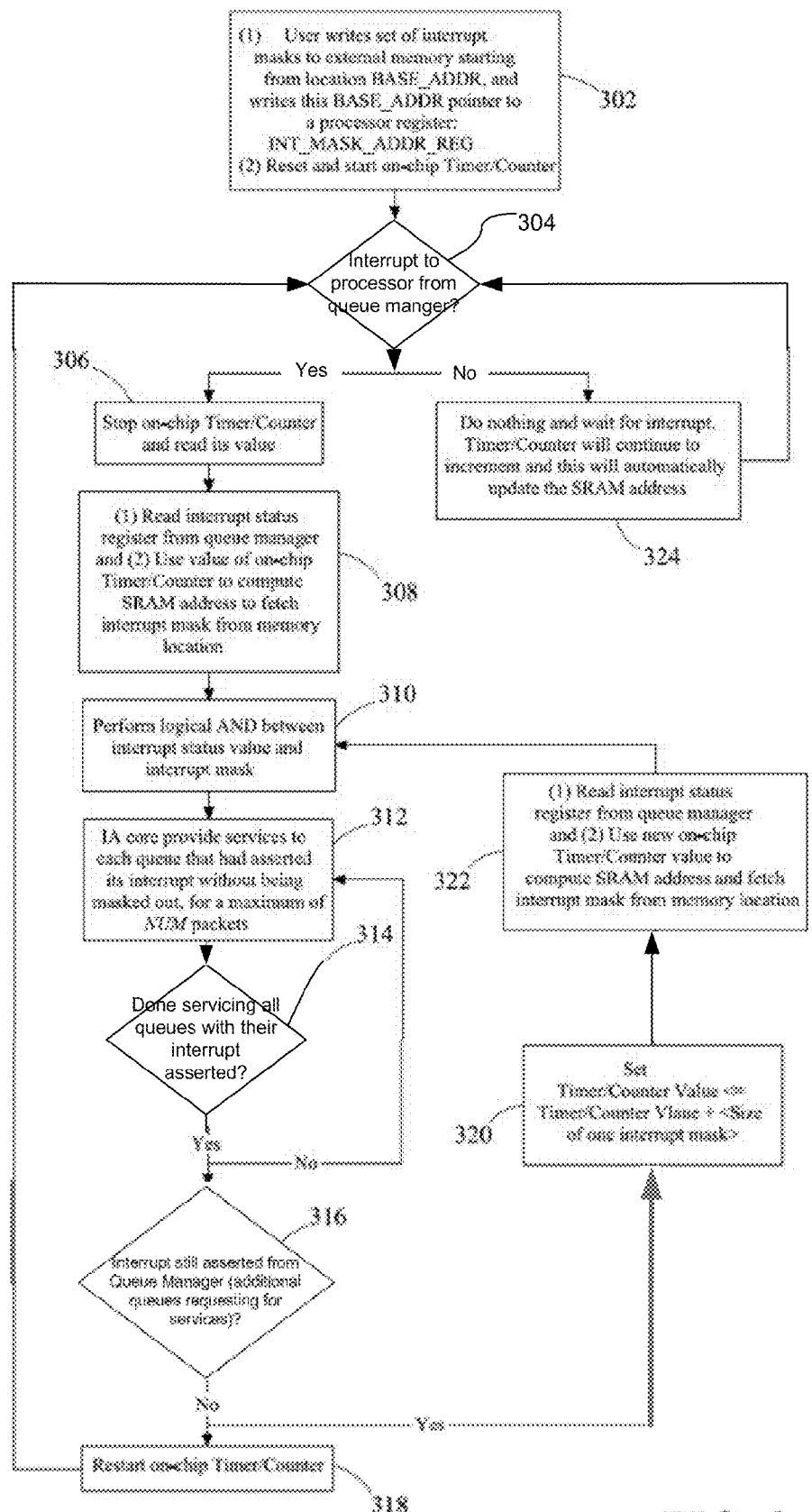
FIG. 3 is a flowchart illustrating a software flow of the method for providing QoS processing of the plurality of data packets, according to an embodiment of the present disclosure.

FIG. 3 is a flowchart illustrating a software flow of the method for providing QoS processing of data packets. At operation 302, a user of the system writes a set of interrupt masks to external memory or SRAM 114 starting from a location base address and writes the base address pointer to a processor register or processor cache 130 (INT_MASK_ADDR_REG). The counter 116 is reset, thereby pointing to the base address, or address of interrupt mask 1, 132 in FIG. 1. At operation 304, it is determined whether an interrupt to the processor 112 from the queue manager module 110 is made. If the interrupt to the processor from the queue manager module 110 is made, then at operation 306, the counter may be stopped and its value may be read into INT_MASK_ADDR_REG. At operation 308 the interrupt status register 124 may be read using any suitable data path (e.g., the processor), an interrupt mask is fetched from the SRAM 114 using the address pointer stored in INT_MASK_ADDR_REG. At operation 310, the processor 112 may perform a logical AND/OR between the value/contents of interrupt status register 124 and the interrupt mask fetched in operation 308. At operation 312 the processor 112 provides service for each queue that had asserted its interrupt without being masked out, for a maximum number of NUM packets, the NUM packets is the maximum number of data packets that a queue of the plurality of queues can receive service in a single round of interrupt mask and interrupt status register logical operation.

At operation 314, it is determined whether the queues that have asserted their interrupts being serviced by the processor 112. If a queue is present that is not serviced or processing of the data packets corresponding to that queue is not done, then control goes to operation 312. If all the queues that have asserted their interrupts are serviced by the processor 112, then at operation 316 it is determined whether an interrupt is asserted by the queue manager module 110. If no interrupt is asserted by the queue manager module 110, then at operation 318 the counter may be restarted and control continues to operation 304. If the interrupt is asserted from the queue manager module 110, then at operation 320 the counter is incremented, and the value of counter is equal to the sum of previous value of counter and size of one interrupt mask, this new value may be stored in INT_MASK_ADDR_REG as a new interrupt mask address pointer. The value of counter 116 may be updated such that the next interrupt mask in line may be selected for masking of values in the interrupt status register 124 for the next round when queues are full. When the queues are empty the counter may keep advancing the interrupt mask pointer to prevent starvation of lower priority queues. At operation 322, contents of the interrupt status register 124 are read, and using the address stored in INT_MASK_ADDR REG, an interrupt mask may be fetched from the SRAM 114. The control goes to operation 310. If at operation 304, there is no interrupt from the queue manager module 110, then at operation 324 no task is done, however the counter 116 may automatically update the interrupt mask address pointer by continuing to count.

Figure 4A:
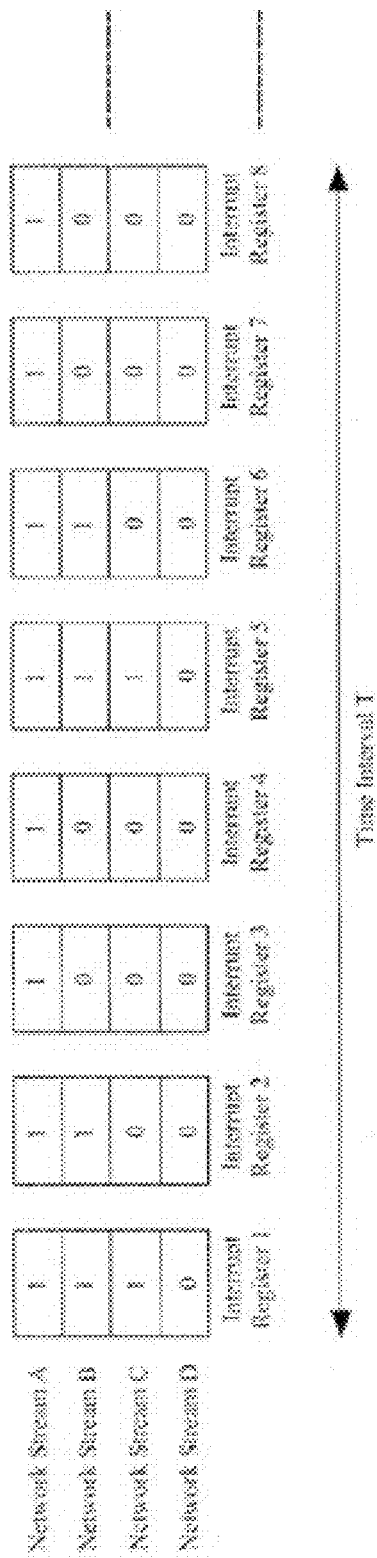
FIGS. 4A and 4B illustrate examples of QoS processing of data packets.
Figure 4B:
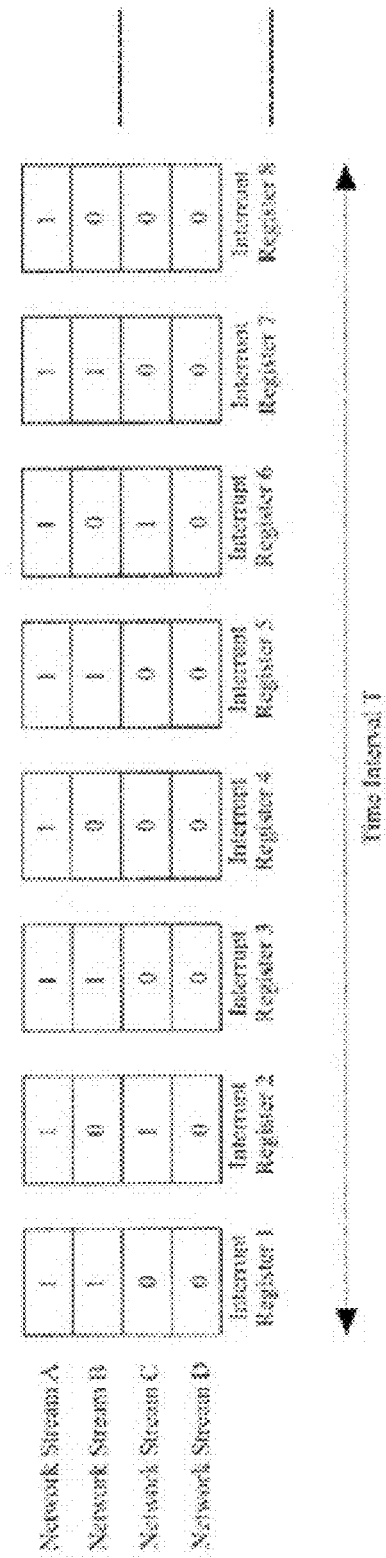

FIG. 4A and 4B are diagrams illustrating an example of QoS processing of data packets. In FIG. 4A stream A has twice the bandwidth of stream B, and four times the bandwidth of Stream C in time interval T. Further, the stream D is disabled. By changing the bit pattern for stream B and C as shown in FIG. 4B, streams B and C become isochronous streams with same bandwidth as stream B and C. The bit pattern is programmable to implement bulk and isochronous behavior.

Furthermore, the priority of multiple queues can be grouped together and managed by a single bit in the interrupt mask. For example, to manage 30 queues with only 3 different priority levels similar to network streams 1, 2 and 3 in FIG. 4B, queue 1 to N can be collectively assigned to have the bandwidth of Network Stream 1, queue N+1 to M assigned to have the bandwidth of Network Stream 2, and queue M to 30 assigned to have the bandwidth of Network Stream 3 (where 1<N<M<30).

Figure 5:
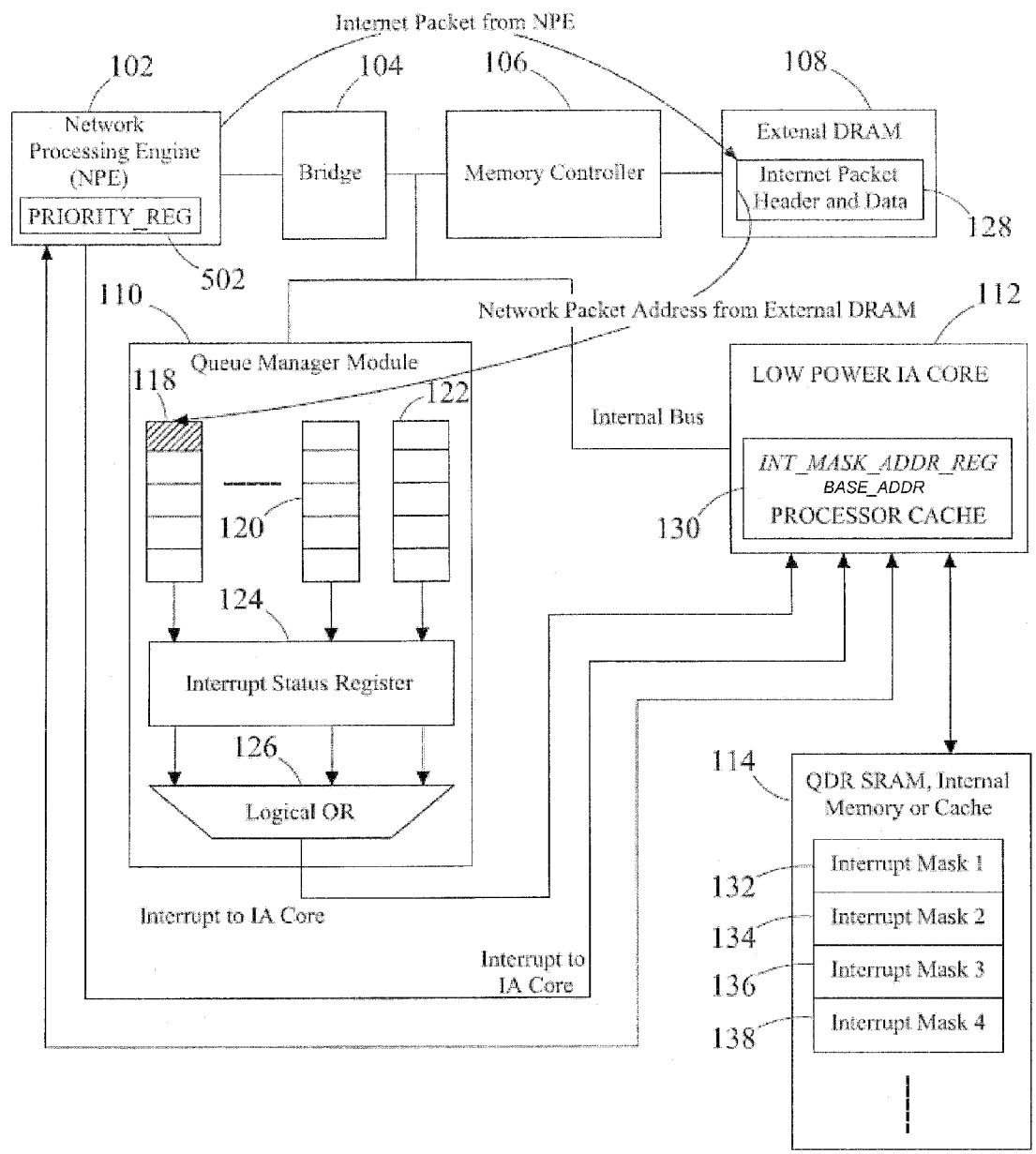
FIG. 5 illustrates a system for providing dynamic priority to the data packets, according to an exemplary embodiment of the present disclosure.

FIG. 5 illustrates a system for providing dynamic priority to the data packets. The system comprises a Network Processing Engine (NPE) 102, a bridge 104, a Memory controller 106, an external Dynamic Random Access Memory (DRAM) 108, a queue manager module 110, a processor 112 (e.g., an Intel Architecture embedded processor core), a Static Random Access Memory (SRAM) 114 and a priority register 502.

In addition to the system described in FIG. 1, a priority register 502 is provided. The priority register is used for storing information extracted by the NPE 102. The information includes priority information of a data packet, a bit pattern of an interrupt mask of the data packet, a queue number and an encrypted key. The encrypted key is used for checking whether the data packet has privilege for purposes of updating the information. If the privilege is there, then the priorities of the data packet, the bit pattern of the interrupt mask of the data packet and queue number can be updated. The priority register 502 sends an interrupt to the processor 112. The processor 112 reads the encrypted key and checks whether the necessary privilege to change priority are there. Thereafter, if the encrypted key matches, then processor 112 replaces the current bit pattern of interrupt mask and current priority information with the new bit pattern of interrupt mask and new priority information, respectively. Multiple security keys may also be provided for ensuring different level of access privileges.

Figure 6:
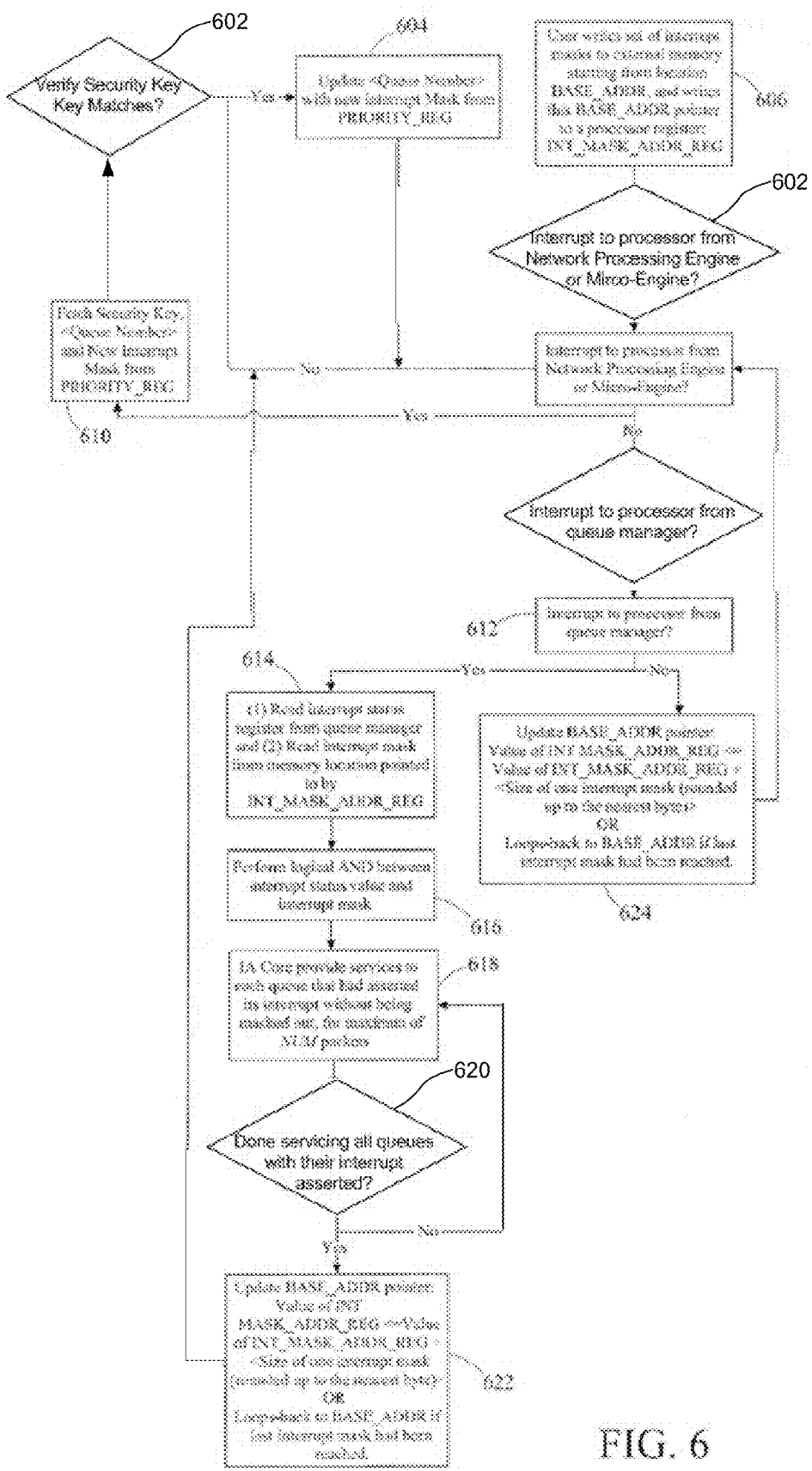
FIG. 6 is a flowchart illustrating a software flow of a method for providing dynamic priorities to the data packets, according to an exemplary embodiment of the present disclosure.

FIG. 6 is a flowchart illustrating a software flow of the method for providing dynamic priorities to the data packets. Dedicated bit patterns (interrupt masks) are pre-written into consecutive location in SRAM 114 starting from a base address BASE_ADDR, and the base address is stored in a register or a locked down entry of processor cache/cache memory 130 INT_MASK_ADDR_REG. At operation 602, the security key is verified to check whether the necessary privilege to change priority is there. Thereafter if the security key matches, then at operation 604, the queue number is updated by replacing the interrupt mask of a queue with a new interrupt mask. If the security key does not match, then control goes to operation 608. At operation 608, it is determined whether there is any interrupt from the NPE 102 to the processor 112, NPE may assert an interrupt if there is a new interrupt mask and security key from data packets stored in priority register 502, if there is an interrupt, then the control goes to operation 610. At operation 610, the security key and new interrupt mask are fetched from priority register 502 for further processing in operation 602. At operation 612, if there are no pending interrupts from queue manager module 110, processor 112 will increment the value of INT_MASK_ADDR_REG/base address by size of 1 interrupt mask. Size of the increment will depend on the number of queues at operation 624. For instance, if 64 queues are present then a 64 bit word is needed to keep track of all the individual queue interrupts and the increment size is 8 bytes.

If there are pending interrupts from queue manager module 110 queues, then at step 614, the Processor 112 reads the interrupt status register 124 and reads the interrupt mask from the SRAM 114 pointed by the base address/INT_MASK_ADDR_REG in cache memory 130. At operation 616, the processor 112 performs logical AND/OR operation between the contents of interrupt status register 124 and interrupt masks to determine, the queue causing the interrupt. At operation 618, the processor 112 provides service to each queue that had asserted its interrupt without being masked out for a maximum of NUM packets. At operation 620, it is determined whether all the queues that have asserted their interrupts have been serviced. At operation 622, if all the queues that had asserted their interrupts have been serviced, the processor 112 increments the values of base address/INT_MASK_ADDR_REG by a size of 1 interrupt mask, or may loop back to the first location in the SRAM 114, (i.e., interrupt mask 1, 132) when the last interrupt mask in the plurality of interrupt masks has been reached. This operation may update the interrupt mask pointer in a circular manner. At this point, control may proceed to operation 608. Control may return to 608 after each round of updating the pointer, whether it be advancing to the next interrupt mask or returning to the first mask when the last mask is reached. At operation 624, the value of IN_MASK_ADDR_REG/base address will increment by a size of 1 interrupt mask, or loop back to the first location in the SRAM 114, i.e. interrupt mask 1, 132 when the last interrupt mask in the plurality of interrupt masks has been reached, and control may proceed to operation 608. The operation 608 is repeated for the next interrupt mask in line. This may continue, i.e., the interrupt mask pointer may progress in a circular fashion and loop back to the first mask when the last one has been reached.

Figure 7A:
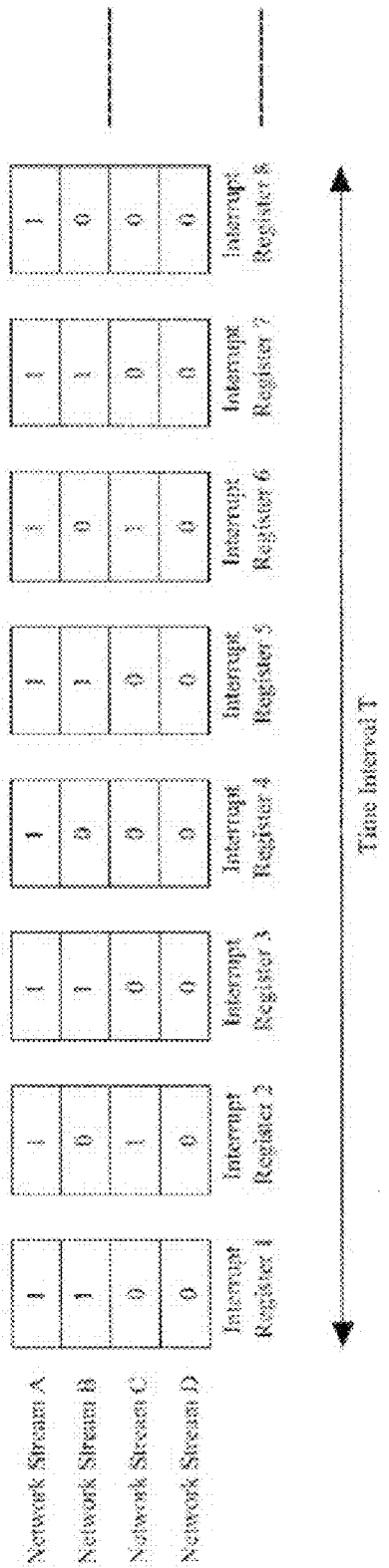
FIGS. 7A and 7B illustrate examples of QoS processing of data packets having dynamic priorities.
Figure 7B:
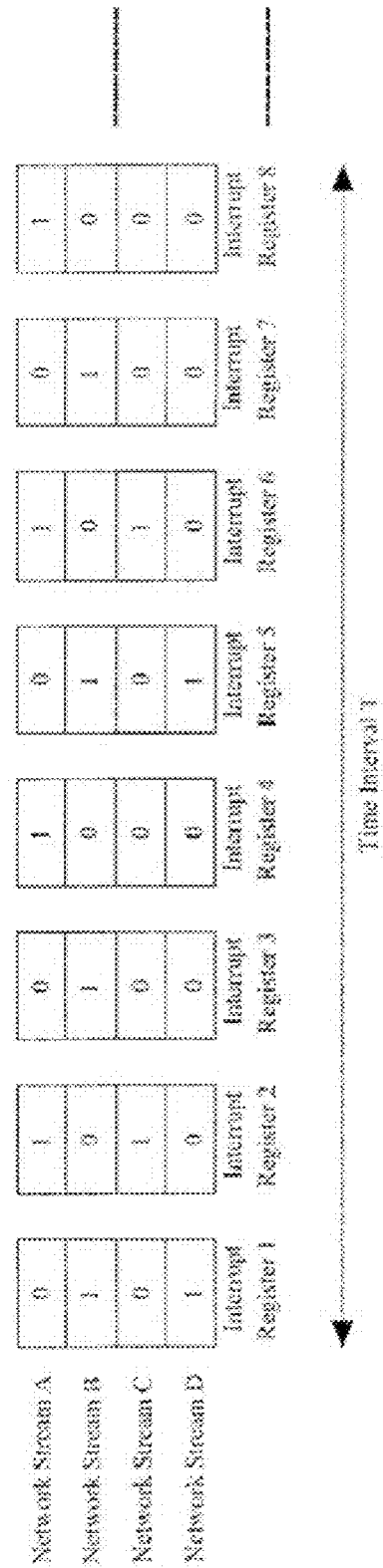

FIGS. 7A and 7B illustrate examples of QoS processing of data packets having dynamic priorities as described in FIG. 6. In FIG. 7A stream A has highest priority, streams B and C are isochronous streams with the same bandwidth while stream D is disabled. In FIG. 7B, after a security key is verified, stream A is changed to isochronous with reduced bandwidth and stream D is reactivated with low isochronous traffic priority.

As shown in FIGS. 4 & 7, an interrupt mask corresponds to an interrupt enable register (vertical array). The number of interrupt masks in FIGS. 4 & 7 is 8 (horizontal). Each interrupt mask must have the same number of bits as the interrupt status register to enable bit wise logical operation to be performed between the two. The interrupt status register must have the same number of bits as there are network streams/queues with differing priorities. The number of interrupt mask can be scaled (horizontally in FIG. 4 and 7) to enable greater QoS flexibility, for example if the number of masks is increased from 8 to 16 then there will be greater number of slots (horizontally) for a user to write ONES and ZEROES for greater variation in the number of packets each network stream can send within time interval T.

The disclosure provides a mechanism for storing the state of each and every queue priority in memory and offloads the task of managing queue priorities from the core processor. Priority information of queues is reduced to keeping track of a pointer to memory. This simple task can be done through a co-processor and/or counters leaving the core processor solely for servicing network packets. Furthermore, priority information of queues are dynamically and automatically managed by queue management software with little overhead based on real time network traffic condition and bandwidth requirements needs, irrespective of the number of queues. The priority information is secured with the security key feature, thus privileged network streams can be used remotely and dynamically change priority information which enables easy management of complex networking system QoS. The administrator of the system can dynamically change the priorities by changing the interrupt mask set in the memory. Furthermore, programming of bit patterns of ones and zeros into the interrupt masks and having different packet quota NUM for each queue allows network streams to have either bulk or isochronous behavior to suit the needs of different types of applications and the number of queues is scalable by adjusting the length of the interrupt masks.

As described above, the embodiments of the disclosure may be in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present disclosure.

What is claimed is:

1. A system for providing Quality of Service (QoS) processing of a plurality of data packets, the system comprising:
   a processing engine capable of receiving the plurality of data packets;
   a first memory for storing the plurality of data packets received by the processing engine;
   a queue manager module comprising:
   an interrupt status register, and
   a plurality of queues comprising an address of at least one data packet of the plurality of data packets, wherein at least one individual bit in the interrupt status register specifies a queue of the plurality of queues causing an interrupt;
   a second memory for storing a plurality of interrupt masks in consecutive locations starting from a base address, each interrupt mask comprising a bit pattern specifying whether an interrupt is masked for a queue of the plurality of queues;
   a third memory for storing an interrupt mask address pointer;
   at least one processor configured to:
   read the interrupt status register to determine which queue of the plurality of queues is causing an interrupt,
   read an interrupt mask from said plurality of interrupt masks using said interrupt mask address pointer stored in said third memory;
   perform a logical operation between the contents of the interrupt status register and said plurality of interrupt masks stored in said second memory; and
   process the plurality of data packets based on said logical operation; and
   a counter for incrementing the interrupt mask address pointer to point to another interrupt mask of the plurality of interrupt masks.

2. The system of claim 1, further comprising a priority register in the network processing engine for storing information embedded inside the plurality of data packets.

3. The system of claim 2, wherein the information comprises at least one of priority information of a data packet, bit pattern of an interrupt mask, a queue number and an encrypted key for providing dynamic priority to the data packet.

4. The system of claim 1, wherein bulk or isochronous behavior for the system is implemented by at least one of:
programming bit patterns of the plurality of interrupt masks; and
specifying a predefined number of data packets to be given service for each round of interrupt mask and interrupt status register logical operation for each queue of the plurality of queues.

5. The system of claim 1, wherein the first memory is selected from the group consisting of Dynamic Random Access Memory (DRAM), cache memory, and Static Random Access Memory (SRAM).

6. The system of claim 1, wherein the second memory is selected from the group consisting of a Dynamic Random Access Memory (DRAM), cache memory and Static Random Access Memory (SRAM).

7. A method for providing Quality of Service (QoS) processing of a plurality of data packets, the method comprising:
storing the plurality of data packets received by a processing engine in a first memory;
storing a plurality of interrupt masks in consecutive locations of a second memory starting from a base address, each interrupt mask comprising a bit pattern specifying whether an interrupt is masked for a queue of the plurality of queues;
storing an interrupt mask address pointer in a third memory;
reading, by a processor, an interrupt status register to determine which queue of a plurality of queues is causing an interrupt, the queue comprising address of at least one data packet of the plurality of data packets;
reading, by said processor, the interrupt mask from said plurality of interrupt masks using said interrupt mask address pointer stored in said third memory;
performing a logical operation at said processor between the contents of the interrupt status register and an interrupt mask of a plurality of interrupt masks stored in said second memory;
processing the plurality of data packets based on the logical operation at said processor; and
incrementing said interrupt mask address pointer stored in said third memory to point to another interrupt mask of the plurality of interrupt masks.

8. The method of claim 7, further comprising:
extracting information stored in the plurality of data packets to a priority register, wherein the information comprises priority information of a data packet, bit pattern of an interrupt mask, a queue number and an encrypted key; and
updating the information of the plurality of data packets, thereby providing a dynamic priority to the plurality of data packets.

9. The method of claim 8, wherein the encrypted key provides a secure mechanism for updating the information.

10. The method of claim 8, wherein the information comprises a plurality of keys for providing a plurality of levels of access privileges.

11. The method of claim 7, further comprising at least one of:
programming bit patterns of the plurality of interrupt masks; and
specifying a predefined number of data packets to be given service for each round of interrupt mask and interrupt status register logical operation for each queue of the plurality of queues, for implementing bulk or isochronous behavior.

12. The method of claim 7, wherein the logical operation is performed periodically.

13. The method of claim 7, wherein the addresses of the data packets are stored in the plurality of queues based on a priority of each data packet of the plurality of data packets.

14. The method of claim 7, wherein the QoS processing of the plurality of data packets is used for applications comprising at least one of video streaming, teleconferencing and Voice over Internet Protocol (VoIP).

15. An article comprising a storage medium having stored thereon instructions that when executed by a machine result in the following:
storing a plurality of data packets received by a processing engine in a first memory;
storing a plurality of interrupt masks in consecutive locations of a second memory starting from a base address, each interrupt mask comprising a bit pattern specifying whether an interrupt is masked for a queue of the plurality of queues;
storing an interrupt mask address pointer in a third memory;
reading, by a processor, an interrupt status register to determine which queue of a plurality of queues is causing an interrupt, the queue comprising address of at least one data packet of the plurality of data packets;
reading, by said processor, the interrupt mask from said plurality of interrupt masks using said interrupt mask address pointer stored in said third memory;
performing a logical operation by said processor between the contents of the interrupt status register and an interrupt mask of a plurality of interrupt masks stored in said second memory;
processing the plurality of data packets based on the logical operation at said processor; and
incrementing said interrupt mask address pointer stored in said third memory, thereby pointing to another interrupt mask of the plurality of interrupt masks.

16. A system for providing Quality of Service (QoS) processing of a plurality of data packets, the system comprising:
a processing engine capable of receiving the plurality of data packets;
a first memory for storing the plurality of data packets received by the processing engine;
a queue manager module comprising:
an interrupt status register, and
a plurality of queues comprising an address of at least one data packet of the plurality of data packets, wherein individual bits in the interrupt status register specifies a queue of the plurality of queues causing an interrupt;
a second memory for storing a plurality of interrupt masks in consecutive locations starting from a base address, each interrupt mask comprising a bit pattern specifying whether an interrupt is masked for a queue of the plurality of queues;
a third memory for storing an interrupt mask address pointer;
at least one processor configured to:

read the interrupt status register to determine which queue of the plurality of queues is causing an interrupt, read an interrupt mask from said plurality of interrupt masks using said interrupt mask address pointer stored in said third memory;

perform a logical operation between the contents of the interrupt status register and said plurality of interrupt masks stored in said second memory; and process the plurality of data packets based on said logical operation; and a priority register in the network processing engine for storing information embedded inside the plurality of data packets.

17. The system of claim 16, wherein the information comprises at least one of priority information of a data packet, bit pattern of an interrupt mask, a queue number and an encrypted key for providing dynamic priority to the data packet.

18. The system of claim 16, wherein the first memory is selected from the group consisting of Dynamic Random Access Memory (DRAM), cache memory and Static Random Access Memory (SRAM).

19. The system of claim 16, wherein the second memory is selected from the group consisting of Dynamic Random Access Memory (DRAM), cache memory and Static Random Access Memory (SRAM).

20. The system of claim 16, further comprising a counter for incrementing the base address, thereby pointing to another interrupt mask of the plurality of interrupt masks.

* * * * *